United States Patent [19]

Mathews et al.

[11] Patent Number: 5,048,849
[45] Date of Patent: Sep. 17, 1991

[54] CHANGE STROLLER

[76] Inventors: Linton Mathews; Teresa L. Mathews, both of 6621 Cowboy Trail, Las Vegas, Nev. 89131

[21] Appl. No.: 463,151
[22] Filed: Jan. 10, 1990
[51] Int. Cl.⁵ .............................................. B62B 3/00
[52] U.S. Cl. .............................. 280/47.35; 280/79.11; 272/70.3; 135/67
[58] Field of Search ........... 280/87.051, 87.05, 87.021, 280/47.35, 47.34, 79.11, 79.3; 272/70.3; 135/67, 85; 40/590; 194/350

[56] References Cited

U.S. PATENT DOCUMENTS

| | | | |
|---|---|---|---|
| 2,865,647 | 12/1958 | Wilson | 280/47.35 |
| 3,371,795 | 3/1968 | Rosonke | 211/14 |
| 3,391,930 | 7/1968 | Weissman | 272/70.3 |
| 3,702,033 | 11/1972 | Coleman | 40/590 |
| 3,856,320 | 12/1974 | Blanchard | 280/47.35 |
| 4,184,618 | 1/1980 | Jones | 135/67 |
| 4,264,081 | 4/1981 | Markham | 280/5.24 |
| 4,342,465 | 8/1982 | Stillings | 280/87 |
| 4,721,317 | 1/1988 | Avot | 280/47.35 |
| 4,765,355 | 8/1988 | Kent | 135/67 |
| 4,886,286 | 12/1989 | Whorton | 280/47.35 |

FOREIGN PATENT DOCUMENTS

| | | | |
|---|---|---|---|
| 978587 | 12/1964 | United Kingdom | 272/70.3 |
| 1478137 | 6/1977 | United Kingdom | 135/67 |
| 8905675 | 6/1989 | World Int. Prop. O. | 272/70.3 |

Primary Examiner—David M. Mitchell
Attorney, Agent, or Firm—Quirk, Tratos & Roethel

[57] ABSTRACT

A change stroller has a vertically upright framework mounted on wheels and a laterally extending upper cross member on which a change belt is supported. The stroller wheels are positioned to provide a center of gravity that will compensate for the off center weight of the change belt when it is filled with coin rolls.

16 Claims, 4 Drawing Sheets

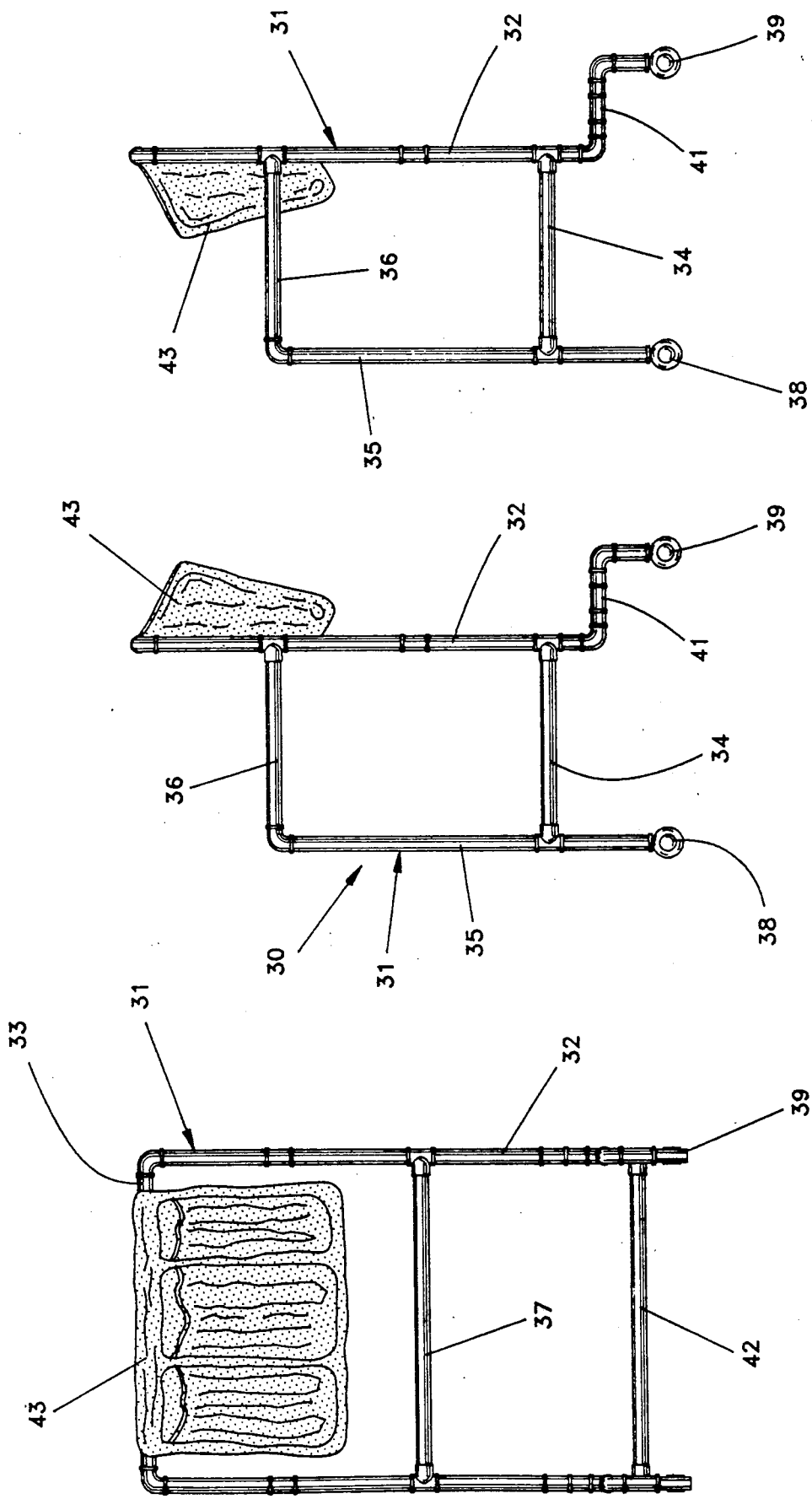

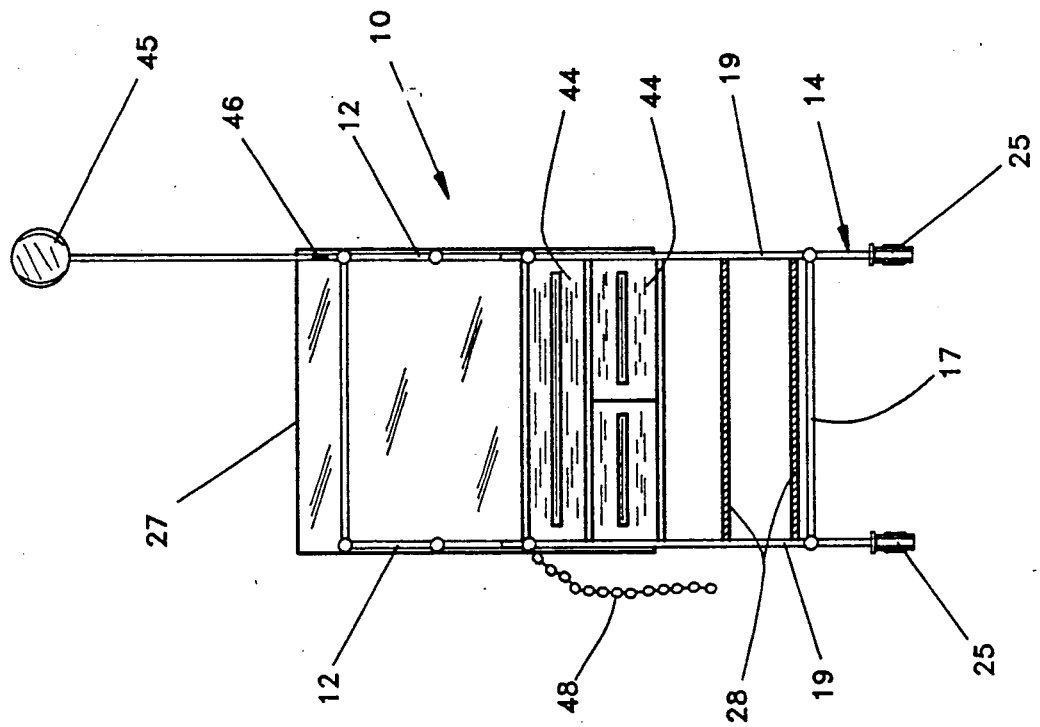
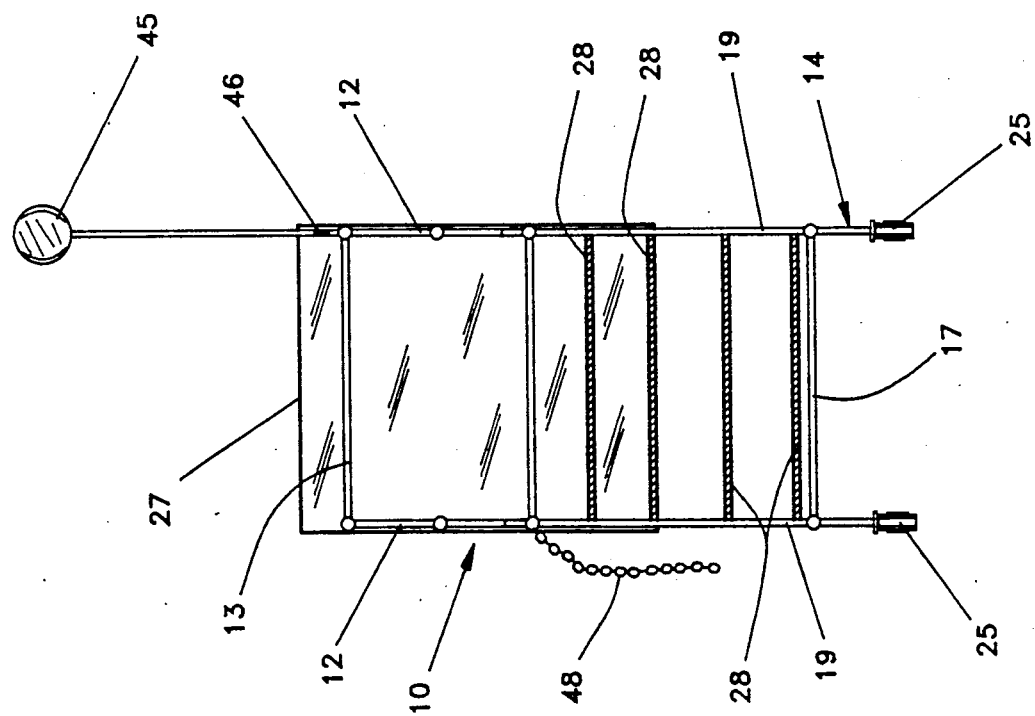

CHANGE STROLLER

This invention relates to a change stroller and more particularly to a change stroller having a framework adapted to support a change belt, change box or change cartridge, the framework being mounted on wheels for movement about a casino gaming establishment.

BACKGROUND OF THE INVENTION

In the casino gaming business there are many persons who are required to wear what are known as change belts and circulate among the patrons to keep the latter supplied with coins for use in the gaming machines. The coins are usually rolled in paper rollers and carried in the pockets of heavy duty change belts. The belts when filled with rolls of coins can weigh 25 pounds or more. The job of being a change person has traditionally been filled by females and older males and the weight of the change belts frequently aggravate or cause back, leg and ankle strains. These occupational hazards become pronounced after the change belts have been worn for any length of time.

If the change person attempts to lighten the load by only partially filling the change belt, the result is more frequent trips to the coin roll supply cabinet. The supervisors require that the change person spend as much time as possible circulating throughout the gaming establishment providing coins to the gaming patrons. Too many trips to the coin supply cabinet would result in lost gaming time and disgruntled patrons not being able to find the missing change person who is out of the gaming area while replenishing the change belt coin supply.

Accordingly, it is an object of the present invention to relieve change persons of possible health and work related problems caused by having to carry heavy change belts around.

It is a feature of the present invention to provide a change stroller for transporting a supply of coin rolls around the gaming area, the supply of coin rolls on the change stroller being greater than would normally be carried in a change belt worn by a change person.

It is a further feature of the present invention to provide a change stroller fabricated of light weight tubular construction yet having the structural rigidity and stability to carry an adequate supply of coin rolls.

It is a further feature of the present invention to provide a change stroller having a proper center of gravity to counterbalance the weight of the coin rolls placed on the change stroller and having a supply of coin rolls readily accessible by the change person.

It is an advantage of the present invention that health and other work related problems suffered by change persons will be alleviated and the change person will still have ready access to a large supply of coin rolls so that gaming patrons can be provided with the change that they need for the various coin operated gaming devices in the gaming establishment.

It is a further advantage of the present invention that change persons will be able to spend more time circulating throughout the gaming establishment providing change and less time making trips to the coin supply cabinet to replenish their supply of coin rolls.

These and other objects, features and advantages of the invention will be apparent from the following disclosure of the preferred embodiments of the present invention.

SUMMARY OF THE INVENTION

The present invention relates to a change stroller having a vertically upright framework mounted on wheels and having a laterally extending crossbar on which a change belt is supported. The stroller wheels are positioned to provide a center of gravity that will compensate for the off center weight of the change belt when it is filled with coin rolls.

Alternatively, the change stroller can be provided with shelves and drawers for holding the coin rolls, either in addition to the change belt or in lieu thereof.

BRIEF DESCRIPTION OF THE DRAWINGS

FIG. 5 is a front elevation view of the change stroller of FIG. 4.

FIG. 6 is a side elevation view of the change stroller of FIG. 4.

FIG. 7 is a side view similar to FIG. 6 showing an another embodiment of the change stroller of FIG. 4.

FIGS. 8 and 9 are views in part similar to FIG. 2 showing further embodiments of the change stroller.

DETAILED DESCRIPTION OF THE PREFERRED EMBODIMENTS

Figure 1:
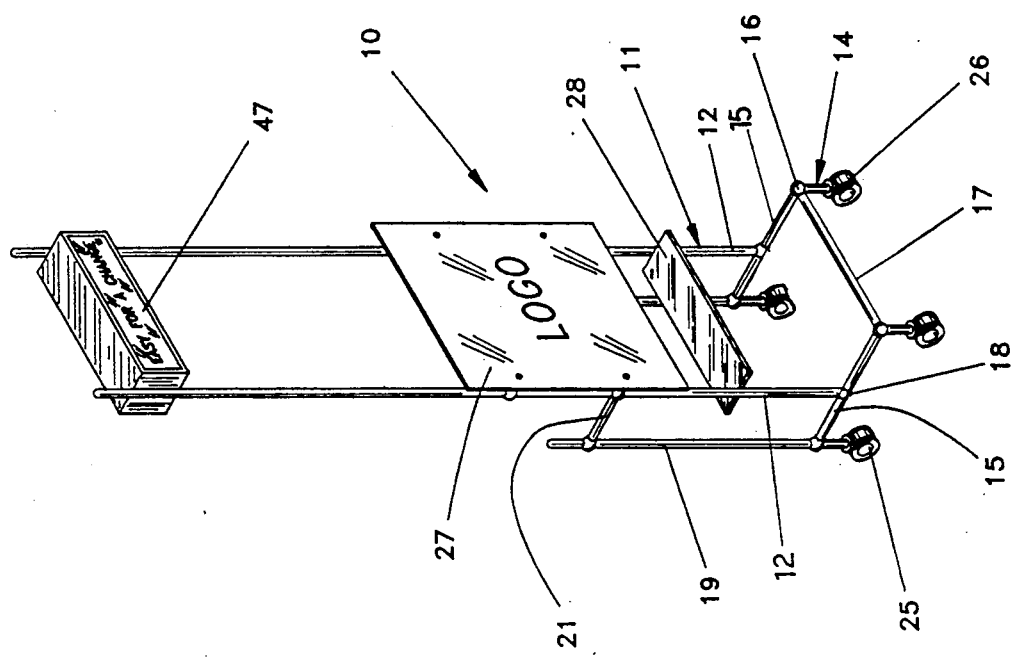
FIG. 1 is a perspective view of a first embodiment of the change stroller embodying the present invention.
Figure 3:
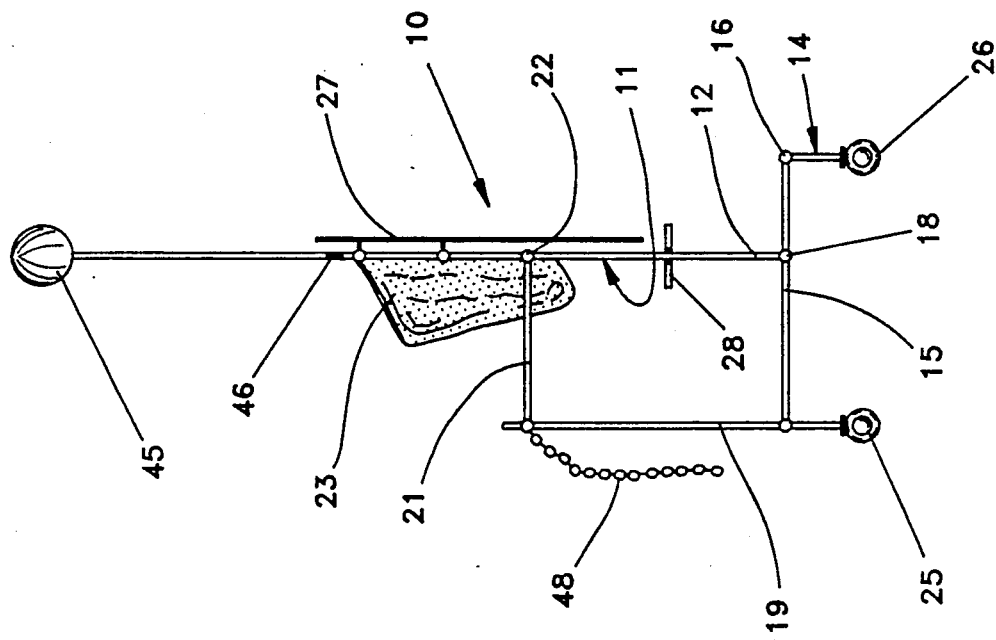
FIG. 3 is a side elevation view of a change stroller in part similar to that shown in FIG. 1 showing another embodiment.
Figure 2:
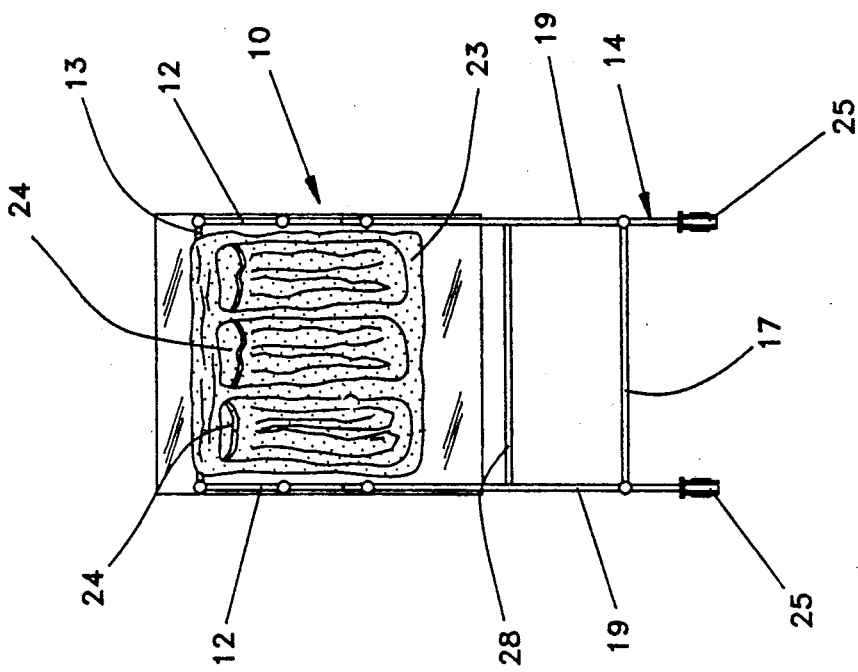
FIG. 2 is a rear elevation view of the basic structure of the change stroller embodying the present invention.

Referring more particularly to FIGS. 1, 2 and 3 wherein like reference numerals refer to like parts in the several views, the change stroller, herein designated generally at 10, comprises a vertically upright framework 11 that preferably is formed of tubular vertical front posts or columns 12. The tubing can preferably be 1" diameter brass, stainless steel or colored pipe and can be either round or square tubing. The vertical front posts 12 are joined at their tops by a laterally horizontal tubular upper cross member 13.

The framework 11 further includes a wheeled platform generally designated 14. The platform 14 comprises a pair of horizontally extending tubular side base members 15 joined at their front ends 16 by a horizontal tubular lower cross member 17. The wheeled platform 14 is open at the rear. In this embodiment, two front wheels 26 and two rear wheels 25 on the platform 14 allow rolling movement of the framework 11. The wheels 25,26 are preferably of the caster type to allow multidirectional movement of the platform 11, although other types of wheels could also be used.

Each of the front posts 12 of the upright framework 11 are attached by welding or pipe fittings at 18 to the wheeled platform side members 15. Extending upwardly from the rear end of each platform side member 15 is a vertical rear post 19. A horizontal tubular handle member 21 extends from the top of rear post 19 to a point of connection 22 to the front vertical post 12. Each vertical rear post 19 and its associated horizontal handle member 21 in effect form a brace or strut system for maintaining the framework in an upright position under loads that would tend to deflect the framework laterally in a fore or aft direction.

As best seen in FIGS. 2 and 3, the framework 11 has as its primary function the support of a heavy flexible change belt 23. The change belt 23 has a plurality of pockets 24 into which rolls of coins can be loaded to be subsequently dispensed to gaming patrons for use in gaming machines. The change belt 23 is removably attached and suspended from the upper cross member 13. It is the weight of the coin rolls in the change belt 23 that requires bracing the upright framework 11 against the lateral fore and aft bending stresses.

The center of gravity of the change stroller 10 is also affected by the placement of the change belt 23 and the weight of coin rolls carried therein. As best seen in FIG. 3, the horizontal distance of the rear wheels 25 from the front posts 12 is greater than the horizontal distance of the front wheels 26 from the front posts 12. This arrangement counterbalances the weight of the change belt 23 which hangs rearwardly of the front posts 12 and minimizes any tendency of the change stroller 10 to tip over in a change spilling direction.

The change stroller 10 may also have a logo panel 27 fastened to the front side of the framework 11. At least one convenience shelf or tray member 28 can be provided between the front posts 12 below or behind the logo panel 27. Ornamental panels may be fastened to the frame members to close the open spaces on each side of the change stroller.

The change person has access to the change belt 23 from the rear of the change stroller 10. The spacing between the handle members 21 is adequate to permit the change person to at least partially enter into the confines of the change stroller 10 while reaching into the change belt 23 or while steering the change stroller 10 around the gaming casino. It is a relatively simple matter for the change person to hold onto the handle members 21 and guide the change stroller 10 through the gaming casino.

Referring now to FIGS. 4 to 7, inclusive, there is shown a further embodiment of the change stroller, herein generally designated at 30. The change stroller 30 has a framework 31 comprising vertical front posts 32 connected at the top by a horizontal upper cross member 33. The front vertical posts 32 are also braced by a horizontal middle cross member 37.

Extending rearwardly from each front post 32 is a lower horizontal member 34 and an upper horizontal member 36. The rear ends of both the lower horizontal member 34 and the upper horizontal member 36 are connected by a vertical rear post 35. The change stroller 30 is provided with a rear wheel 38 at the lower end of each rear post 35. In this embodiment, each rear wheel can simply be a non-swivable wheel, but casters could also be used.

Each front wheel 39 is preferably a caster and is mounted on a horizontally offset inverted L-shaped extension member 41 connected to the lower end of each front post 32. A lower cross member 42 extends between the offset extension members 41.

Figure 4:
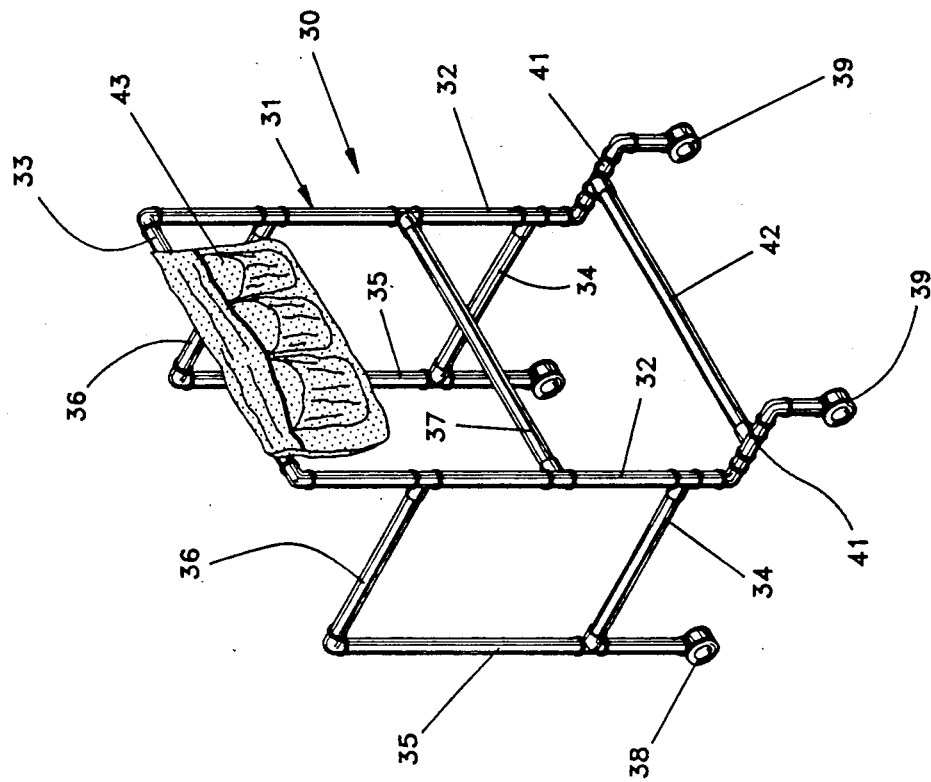
FIG. 4 is a perspective view of another embodiment of the change stroller embodying the present invention.

In FIGS. 4, 5 and 6, the change belt 43 is shown draped over the upper cross member 33 so as to hang in front of the framework 31. In FIG. 7, the change belt 43 is shown draped over the cross member 33 so as to hang to the rear of the framework 31. Whether hanging to the front or the rear of the framework 31, the coin weighted change belt shifts the center of gravity of the change stroller 30 forwardly thus tending to tip the stroller in a forward direction. The offset location of the front wheels 39 effectively counterbalances any tendency of the change stroller 30 to tip forward.

The open rear end of the change stroller 30 permits a change person to step into the change stroller 30 to obtain access to coins in the change belt 43 and to guide the change stroller 30 from one location to another in the gaming establishment.

The change stroller 10 may be provided with various accessories to attract the attention of the gaming patrons. As shown in FIG. 1, the vertical front posts or columns 12 may extend upwardly a substantial distance above the logo panel 27. At the top of the extended posts 12, an electronic message screen mounted on the front face of a housing 47 could be utilized to display advertising slogans or other information as the change stroller 10 is moved about the casino floor.

As shown in FIGS. 3, 8 and 9 the change stroller could be provided a with a single upright extension of a corner post or column 12 surmounted by a signal light 45 operated by a switch 46. The light 45 would be mounted at a level high enough to be visible above the tops of the gaming machines so that a patron desiring change would be able to locate the nearest change person.

Both the electronic message screen in the casing 47 and the light 45 can be operated by any conventional power source, such as batteries (not shown) mounted on the change stroller.

Referring now to FIG. 8, the change stroller could be equipped with a plurality of shelves 28 on which individual boxes of coin rolls of various denominations could be placed in lieu of or in addition to being carried in a change belt 43.

As shown in FIG. 9, the change stroller could be equipped with a plurality of change drawers 44 in which coin rolls of various denominations could be carried in lieu of or in addition to being carried in a change belt 43.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A change stroller comprising:
   (a) a vertically upright framework having at least two laterally spaced vertical front posts, at least two laterally spaced vertical rear posts and at least two laterally spaced horizontal handle members, each of said handle members joining one of said front posts to one of said rear posts so that the framework is open in the rear,
   (b) a laterally extending upper cross member joining the two front posts,
   (c) a change belt attached to the laterally extending upper cross member,
   (d) the framework being mounted on a platform, and
   (e) the platform including wheels thereon, at least one of the platform wheels being offset relative to the vertical front posts to provide for a proper center of gravity to keep the stroller from being tipped in a coin spilling direction by the weight of the change belt attached to the upper cross member.

2. The change stroller according to claim 1 in which the upright framework and the platform are formed of tubular members.

3. The change stroller according to claim 1 in which the change belt has a plurality of coin holding pockets and the change belt is draped over the upper cross member with the coin holding pockets opening forwardly of the upper cross member.

4. The change stroller according to claim 1 in which the change belt has a plurality of coin holding pockets and the change belt is draped over the upper cross member with the coin holding pockets extending rearwardly of the upper cross member.

5. The change stroller according to claim 1 in which at least one tray member is mounted between the frontal vertical posts below the upper cross member.

6. The change stroller according to claim 1 in which the platform further includes a pair of laterally spaced horizontally extending side base members and a horizontally extending front cross member joining an end of each of the side base members so that the platform is open in the rear.

7. The change stroller according to claim 6 in which each of the front posts is attached to one of the side base members at a point remote from the end of the side base member to provide for a proper center of gravity to keep the stroller from being tipped in a coin spilling direction by the weight of the change belt attached to the upper cross member.

8. The change stroller according to claim 7 in which a wheel is attached to each end of each of the side base members.

9. The change stroller according to claim 1 in which a logo panel is secured to a front face of the framework.

10. The change stroller according to claim 1 in which the framework has a signal light mounted on top of an upwardly extending support.

11. The change stroller according to claim 1 in which the framework has an electronic message screen mounted on top of an upwardly extending support.

12. A change stroller comprising:
(a) a vertically upright framework having at least two laterally spaced vertical front posts, at least two laterally spaced vertical rear posts and at least two laterally spaced horizontal handle members, each of said handle members joining one of said front posts to one of said rear posts so that the framework is open in the rear,
(b) a laterally extending upper cross member joining the two front posts,
(c) a change belt attached to the laterally extending upper cross member,
(d) each of the rear posts having a ground engaging wheel at one end thereof, and
(e) each of the front posts terminating in an offset forwardly extending leg operation having a ground engaging wheel at one end thereof
whereby the offset forwardly extending leg portions counterbalance any tendency of the change stroller to be tipped forwardly by the change belt attached to the upper cross member.

13. The change stroller according to claim 12 in which a first horizontal brace extends between the front vertical posts below the upper cross member to strengthen the framework.

14. The change stroller according to claim 13 in which a second horizontal brace extends between the offset forwardly extending leg portions to further strengthen the framework.

15. The change stroller according to claim 12 in which a horizontal brace extends between the offset forwardly extending leg portions to strengthen the framework.

16. A change stroller adapted to receive a change belt mounted thereon comprising:
(a) a vertically upright framework having at least two laterally spaced vertical front posts, at least two laterally spaced vertical rear posts and at least two laterally spaced horizontal handle members, each of said handle members joining one of said front posts to one of said rear posts so that the framework is open in the rear,
(b) a laterally extending upper cross member joining the two front posts,
(c) the framework being mounted on a platform, and
(d) the platform including wheels thereon, at least one of the platform wheels being offset relative to the vertical front posts to provide for a proper center of gravity to keep the stroller from being tipped in a coin spilling direction by the weight of the change belt when it is attached to the upper cross member.

* * * * *